(12) United States Patent
Denyer et al.

(10) Patent No.: US 7,192,005 B2
(45) Date of Patent: Mar. 20, 2007

(54) CONTROL METHOD AND CONTROLLER FOR A SOLENOID-OPERATED ELECTROHYDRAULIC CONTROL VALVE

(75) Inventors: Gary Denyer, Westland, MI (US); Bud Burkhart, Novi, MI (US); Jacob Povirk, Novi, MI (US); Stephen Siatczynski, Bloomfield Hills, MI (US); Hrudaya Mahapatro, Westland, MI (US); Robert Pavlik, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 193 days.

(21) Appl. No.: 10/710,496

(22) Filed: Jul. 15, 2004

(65) Prior Publication Data

US 2006/0011878 A1 Jan. 19, 2006

(51) Int. Cl.
*F16K 31/02* (2006.01)
(52) U.S. Cl. .............. 251/129.08; 251/129.01
(58) Field of Classification Search ......... 251/30.01, 251/129.05, 129.08; 137/625.61, 625.64
See application file for complete search history.

(56) References Cited

U.S. PATENT DOCUMENTS

| | | | |
|---|---|---|---|
| 3,709,253 A | 1/1973 | Spangenberg | |
| 5,083,982 A | 1/1992 | Sato | |
| 5,222,417 A | * 6/1993 | Sato | ............ 474/28 |
| 5,422,556 A | 6/1995 | Graf et al. | |
| 5,673,166 A | 9/1997 | Hoffman | |
| 6,029,703 A | * 2/2000 | Erickson et al. | ....... 137/625.61 |
| 6,170,506 B1 | 1/2001 | Butwin et al. | |
| 2003/0230266 A1 | 12/2003 | Ekdahl et al. | |
| 2004/0003788 A1 | 1/2004 | Taylor et al. | |

FOREIGN PATENT DOCUMENTS

| | | |
|---|---|---|
| JP | 403213763 A | 9/1991 |
| JP | 404248059 A | 9/1992 |

* cited by examiner

*Primary Examiner*—Justine Yu
(74) *Attorney, Agent, or Firm*—David B. Kelley; Brooks & Kushman (57) ABSTRACT

A method and system for controlling a solenoid-operated pressure regulator valve to achieve high compliance with respect to a commanded current in accordance with a precalibrated transfer function. A dither frequency imposed on applied current is changed at precalibrated regulated pressure values to avoid dynamic instability.

8 Claims, 8 Drawing Sheets

CONTROL METHOD AND CONTROLLER FOR A SOLENOID-OPERATED ELECTROHYDRAULIC CONTROL VALVE

BACKGROUND OF INVENTION

1. Field of the Invention

The invention relates to a solenoid-operated control valve with reduced resonance instability and reduced hysteresis.

2. Background of the Invention

Pressure regulation in a hydromechanical valve system typically uses an electronically-controlled valve actuating solenoid, wherein regulated control pressure developed by the valve system is functionally related to current applied to a solenoid actuator in accordance with a calibrated transfer function. Valve systems of this kind are used, for example, in automatic transmissions for automotive vehicles. Control pressure developed by the transmission valve system actuates fluid pressure operated clutch and band servos in a gearing system. The servos are controlled in this fashion to establish and disestablish multiple torque flow paths from an engine to a driven shaft in an automotive powertrain. Calibrated ratio shifts in the gearing are achieved as transmission clutch and band servos are selectively activated. Under certain operating conditions, such systems may be characterized by dynamic instability related to interactions between transmission pressure regulating solenoids and other elements of the hydraulic system.

It is known design practice to introduce a dither frequency for solenoid valve current, causing the current to oscillate at a predetermined high frequency and at a predetermined low amplitude. The dither frequency is applied to the solenoid energizing current to produce a variable magnetic field related to energizing current with a precalibrated transfer function. One type of solenoid used in automotive vehicle powertrains has an output pressure that is inversely proportioned to current. Typically, the output pressure for such solenoids obtained when the energizing current increases is less at a particular current level than the output pressure obtained for the same current level when the current level decreases. Because of this difference (hysteresis effect), the output pressure is not precisely proportional to a given magnetizing current.

The presence of dither frequency imposed on the energizing current improves reliability of the regulating valve by reducing the possibility of valve sticking and by reducing adverse performance of the system valve due to residual magnetism and changes in system compliance related to temperature changes, valve mass, valve spring force, and mass of the regulated fluid itself. The dither frequency also reduces adverse effects of fluid viscosity changes and contamination.

Instability of the operational characteristics of a variable force solenoid can be caused also by internal wear, which can cause a shift in the transfer function relative to an initially calibrated transfer function. This may produce a lower pressure for a given transmission torque demand, which may lead to undesirable elongated ratio shifts in the transmission, friction element flare, and clutch wear. Further, variations in the transfer function may cause undesirable high pressures for a given solenoid current level, which in turn can cause a decrease in shift quality, evidenced by harsh shifts, clutch wear, and friction element tie-ups as one friction element is actuated or released out of synchronism with the application or release of a companion friction element.

It has been found that in control systems of this type, in which a dither frequency is used to reduce variations in transfer function, the electrical hydraulic and mechanical performance of the valve system may change, thereby causing a resonance instability, which can cause unwanted steady-state variations in output pressure.

System compliance may be a function of the amount of air entrained in the fluid within the pressure control system, as well as within mechanical accumulators in the valve system. Such variations in compliance can cause problems due to resonance with respect to the dither frequency. Resonance can result in large amplitude valve oscillation, which can cause metal contact at an end of travel of a valve within its sleeve, thereby causing asymmetrical fluid supply and fluid exhaust flow that shifts the average pressure output of the valve.

SUMMARY OF INVENTION

Electrical dither frequency in a valve system using a solenoid-actuated pressure control valve may not always be sufficiently different relative to the solenoid's natural frequency to prevent resonance. If a fixed frequency is used, it can, under some conditions, be too high to produce sufficient movement to eliminate or to reduce valve sticking and an accompanying undesirable hysteresis. Under other conditions, it may be low enough to cause resonance problems.

In accordance with the present invention, the dither frequency is scheduled to accommodate changes in the solenoid system compliance. The strategy and the calibration of the control system to reduce resonance instability is achieved using dynamic control of the electrical dither frequency. The solenoid transfer function in this way can be calibrated with a given dynamic dither frequency. Data used in achieving the calibrated dynamic dither frequency is obtained from a test stand during a transmission calibration stage to optimize the solenoid control.

The strategy of the invention dynamically controls electrical dither frequency as a function of transmission oil temperature, current, and transmission oil pump speed, for example, to reduce or to avoid undesirable transmission pressure control variations. When the pressure control system becomes unstable at a given commanded pressure level, electrical dither frequency input is changed to avoid resonance, causing the instability to subside or disappear. As commanded pressure increases further, the electrical dither frequency is returned to the original value. In this way, hysteresis is reduced and greater pressure control accuracy, repeatability and stability are achieved, which improve shift quality, clutch durability, and overall operating performance of the transmission. Further, the control of electrical dither frequency in this way reduces internal wear of the solenoid, which over time can cause a shift in the solenoid transfer function. Among other benefits that result from avoidance of a shift in transfer function are improved shift quality and reduction of powertrain speed flare.

DETAILED DESCRIPTION

Figure 1:
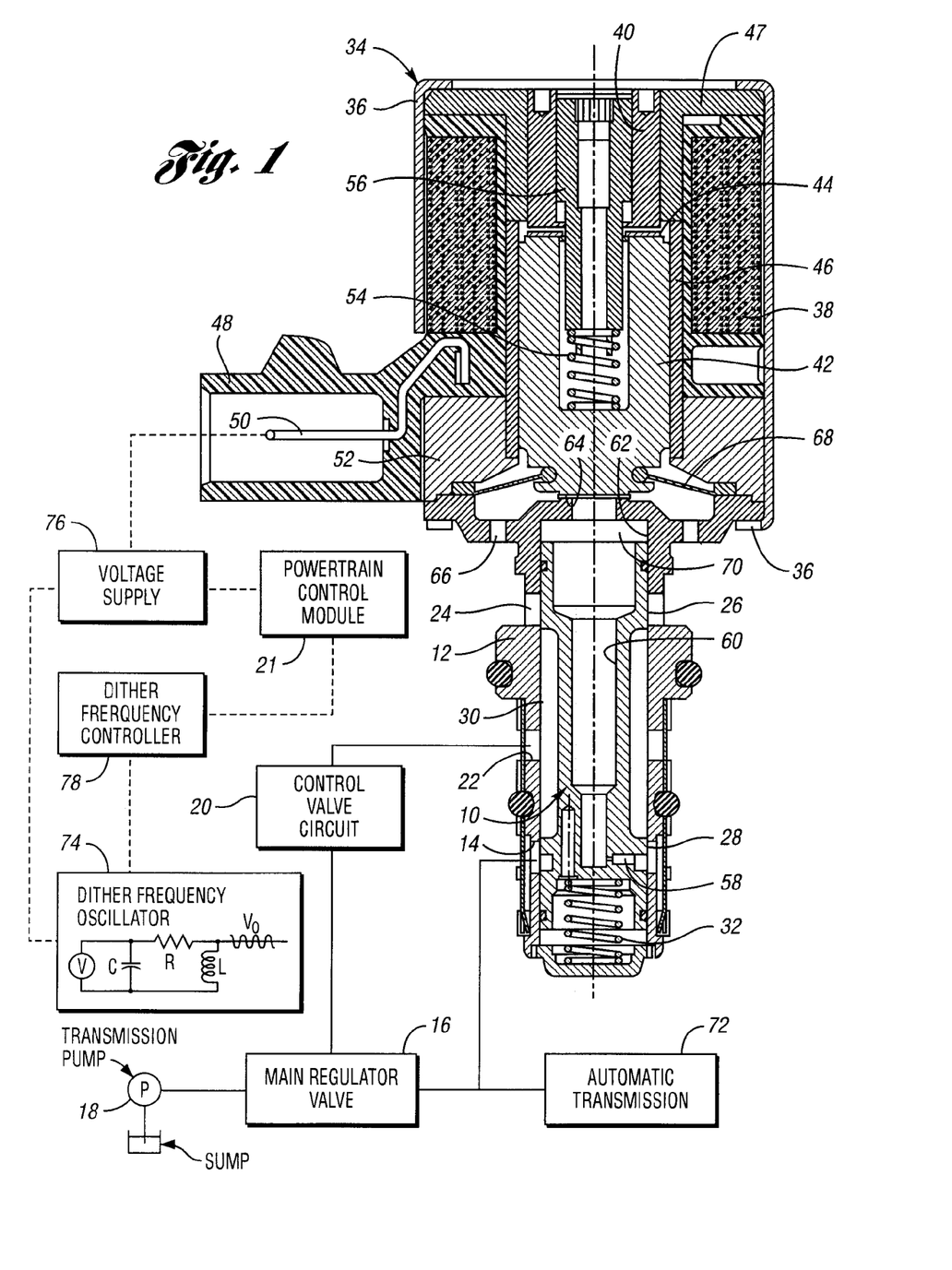
FIG. 1 is a schematic cross-sectional view of a solenoid-operated valve in an automatic transmission control circuit.

FIG. 1 shows a valve spool 10 positioned in a valve body 12. A fluid pressure inlet port 14 in valve body 12 communicates with a main pressure regulator valve 16 of an automatic transmission control system. The main regulator valve is supplied with fluid pressure by a transmission pump 18 driven by an engine in a vehicle driveline. The regulator valve 16 communicates with a transmission control valve circuit 20 and with a valve pressure ports 22 and 14 in valve body 12.

The automatic transmission 72 includes transmission ratio shift valves that respond to regulated line pressure. Controls of this type are well known in the art.

An exhaust port 24 registers with a valve land 26 on the valve spool 10. A companion valve land 28 registers with inlet port 14. Annular space 30 surrounding the valve spool 10 is in communication with the control pressure port 22, and lands 26 and 28 control the degree of communication between port 22 and each of the ports 14 and 24. Spring 32 pushes the valve spool 10 in an upward direction, as viewed in FIG. 1.

A solenoid actuator 34 is located at the upper end of the assembly shown in FIG. 1. The solenoid actuator 34 comprises a solenoid housing 36, which is secured to the upper end of the valve housing, as shown in FIG. 1, at 36. A solenoid coil 38 is housed in the solenoid housing 36. It surrounds a pole piece 40 and a movable armature 42. The armature is aligned with the pole piece and is separated from it by a calibrated air gap 44. An armature guide 46 surrounds the armature 42 and guides movement of the armature 42 as the armature is displaced by the electromagnetic field created by the coil 38.

An electrical connector 48 comprises electrical leads 50 for the coil 38. A connector housing is secured, as shown, between a flux washer 52 and coil 38 within the housing 36. A flux flow path passes through coil 38, upper flux washer 47, housing 36, lower flux washer 52, armature 42, an air gap spacer at 44 and then to pole piece 40.

An armature spring 54 pushes the armature in a downward direction, as viewed in FIG. 1. Spring 54 is seated on an adjustment screw 56 received threadably in pole piece 40. The adjustment screw can adjust the force of spring 54 as it is threadably adjusted in the pole piece 40.

The valve spool 10 has a restricted flow passage 58, which communicates with a central pressure flow passage 60 in the valve spool 10. The passage 60 conducts fluid from the inlet port 14 to a pilot valve orifice 62 in the valve body 12. A pilot valve element 64 at the lower end of the armature 42 registers with the orifice 62 and establishes restricted and controlled communication between passage 60 and exhaust ports 66. The area between exhaust ports 66 and the movable armature 42 is sealed by a flexible diaphragm seal 68.

When the solenoid coil 38 is energized, armature 42 registers with orifice 62, thereby controlling the pressure build-up in pressure cavity 70. That pressure in cavity 70 creates a hydraulic pressure force on the valve spool 10, which opposes the force of spring 32 and the control pressure force acting on the other end of valve spool 10. Thus, the pressure at control pressure port 22 is a function of the electromagnetic force of the armature 42 when an energizing current is applied to the coil 38.

In FIG. 1, electronic connections between the elements of the control system are illustrated by dotted lines. Hydraulic connections are illustrated by solid lines.

The control valve circuit 20 receives regulated control pressure from the solenoid operated valve pressure port 22 and controls main regulator line pressure for clutch and band actuators of the automatic transmission, shown schematically at 72.

A dither current oscillator 74 imposes on voltage supply 76 a dither frequency, as will be explained subsequently with reference to FIG. 6a. Also, as will be explained subsequently, the dither frequency is modified at control pressure demands that tend to develop dynamic instability.

The dither frequency controller, shown at 78, is in electrical communication with powertrain control module 21 and the dither frequency oscillator 74. The powertrain control module includes precalibrated pressure and frequency data in a computer memory. It is effective to modify the dither current supplied to the solenoid supply current when the valve system is in an unstable range of pressure values.

Figure 6:
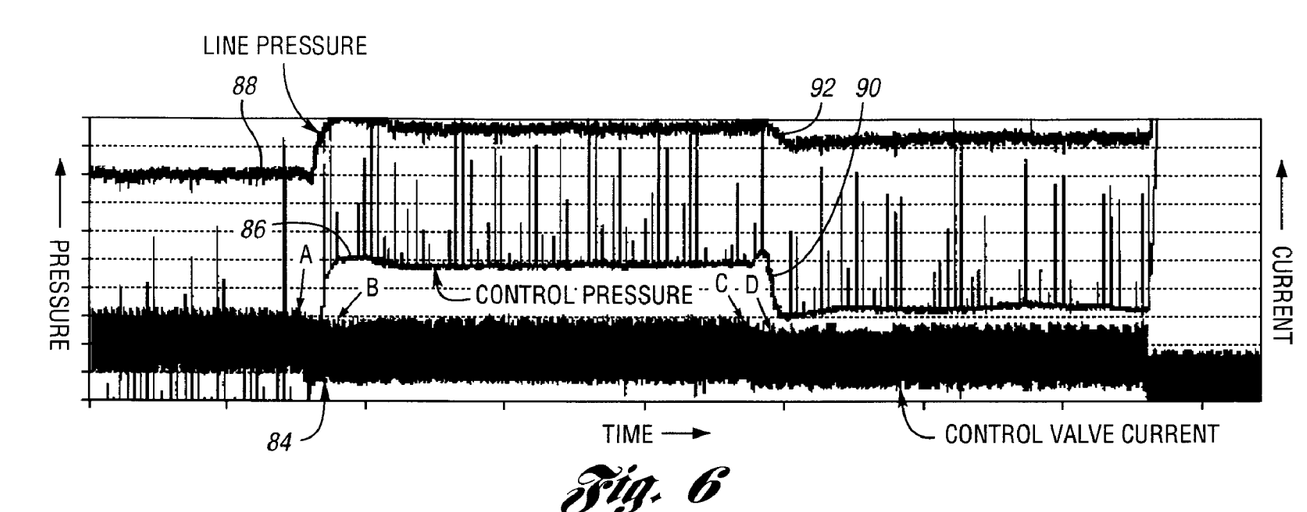
FIG. 6 shows time traces of control valve pressure, line pressure, and control valve current for a transmission solenoid-operated valve, the traces being actual test traces for a solenoid valve without dither frequency control, where instability is detected.
Figure 6A:
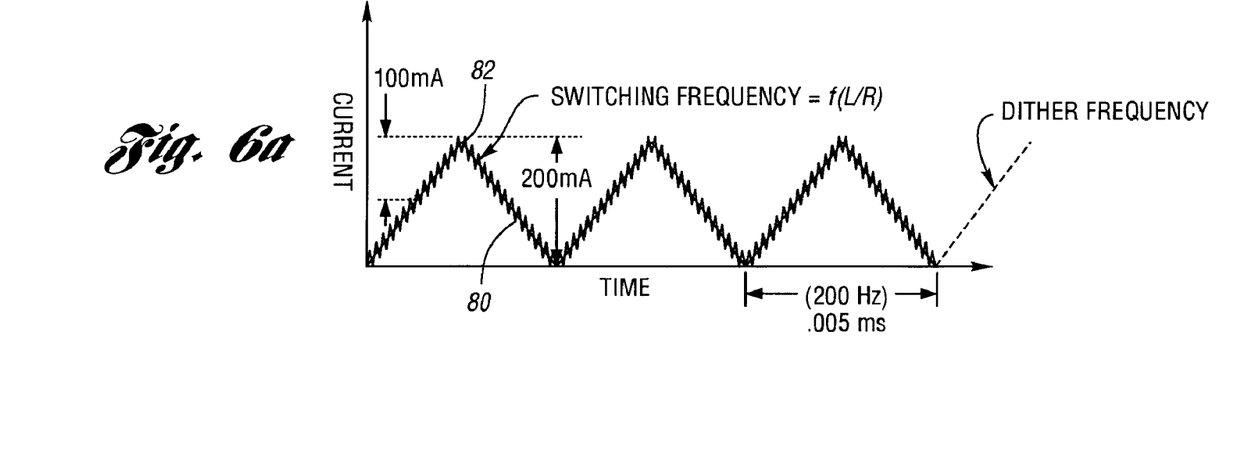
FIG. 6a is a schematic representation of dither frequency for solenoid current applied to a solenoid-operated valve.

FIG. 6a is a time plot that illustrates schematically a sawtooth (triangular) waveform for current supplied to the solenoid coil 38. This is indicated by reference numeral 80. The frequency of the dither current may be approximately 200 Hz and the amplitude may be approximately 200 ma. A conventional switching frequency for current applied to the coil 38 is shown at 82. The switching frequency is caused by the physical characteristics of the solenoid (e.g., inductance and resistance). It may have an amplitude of 100 ma and a high switching frequency that is a function of the particular inductance and resistance of the coil 38.

The control valve current may change from one level shown at A in FIG. 6 to a lower level shown at B. If the solenoid valve is stable, the line pressure and the control pressure should increase when solenoid current decreases. This is demonstrated by traces 88 and 86, respectively. The behavior of the control pressure and the line pressure that accompanies a change of control valve current from point A to point B indicates that the valve is stable. At a later time, indicated by point C, when the control valve current decreases to a lower value indicated at D, the resulting line pressure decreases, as shown at 92. Further, the control pressure decreases as shown at 90. This behavior of the line pressure and the control pressure indicates instability of the valve system because the values for those pressures should increase in an expected pattern similar to the behavior indicated at points A and B. This behavior at points A and B is an inversely proportional relationship between current and pressure.

When instability is expected, the PCM 21 and the dither frequency controller 78 will respond by decreasing or increasing the dither frequency. For example, the controller 78 may decrease the dither frequency by 200 Hz. If the original value for the dither frequency is 200 Hz, the frequency in effect then becomes zero. In an actual embodiment of the invention, this condition can be achieved by shutting off a capacitor in an inductor-capacitor-resistance (LCR) circuit for the dither frequency oscillator 74. On the other hand, if the dither frequency is modified by increasing the frequency value (for example, by changing the dither frequency from 200 Hz to 400 Hz), that too will result in a stable state when the control valve current decreases.

The dither frequency controller 78 can be precalibrated to provide a dither frequency change when the control pressure is within a pressure range corresponding to the control valve current range shown at the region of points C and D in FIG. 6. A dynamic example where the dither frequency is changed to zero in the pressure range of 10 psi to 40 psi and then returned to 200 Hz dither frequency above 40 psi is demonstrated by the calibration plot of FIG. 7. The benefit of this dynamic dither frequency control can be seen by comparing FIG. 7a, in which dither frequency is a constant 200 Hz and instability is present, to FIG. 7 in which dynamic dither frequency control is used and instability is removed.

Figure 7:
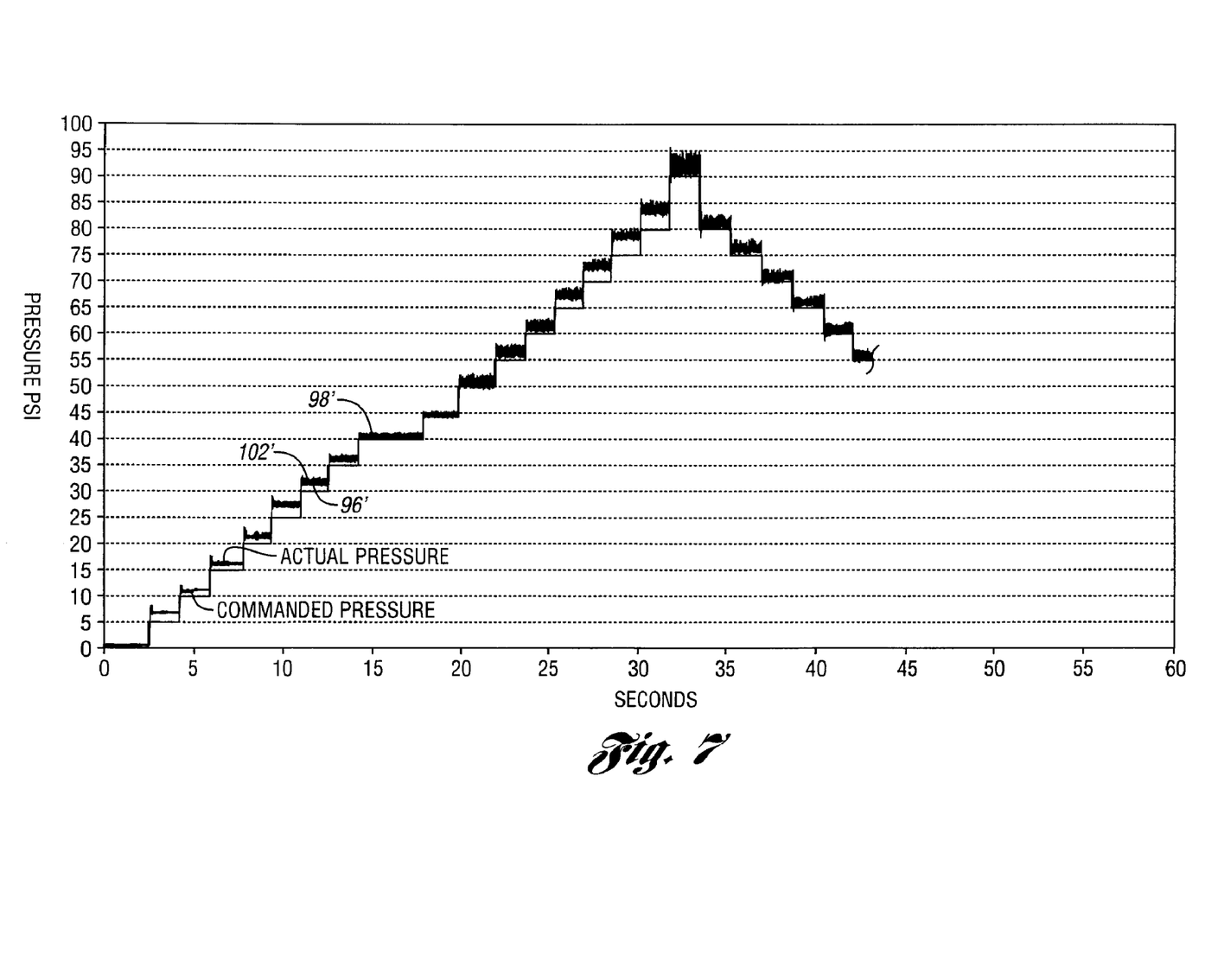
FIG. 7 is a time plot illustrating commanded pressures and corresponding actual pressures measured at various locations on a transfer function, wherein stability is indicated by minimal separation between commanded pressure and actual pressure at various regulated pressure values.
Figure 7A:
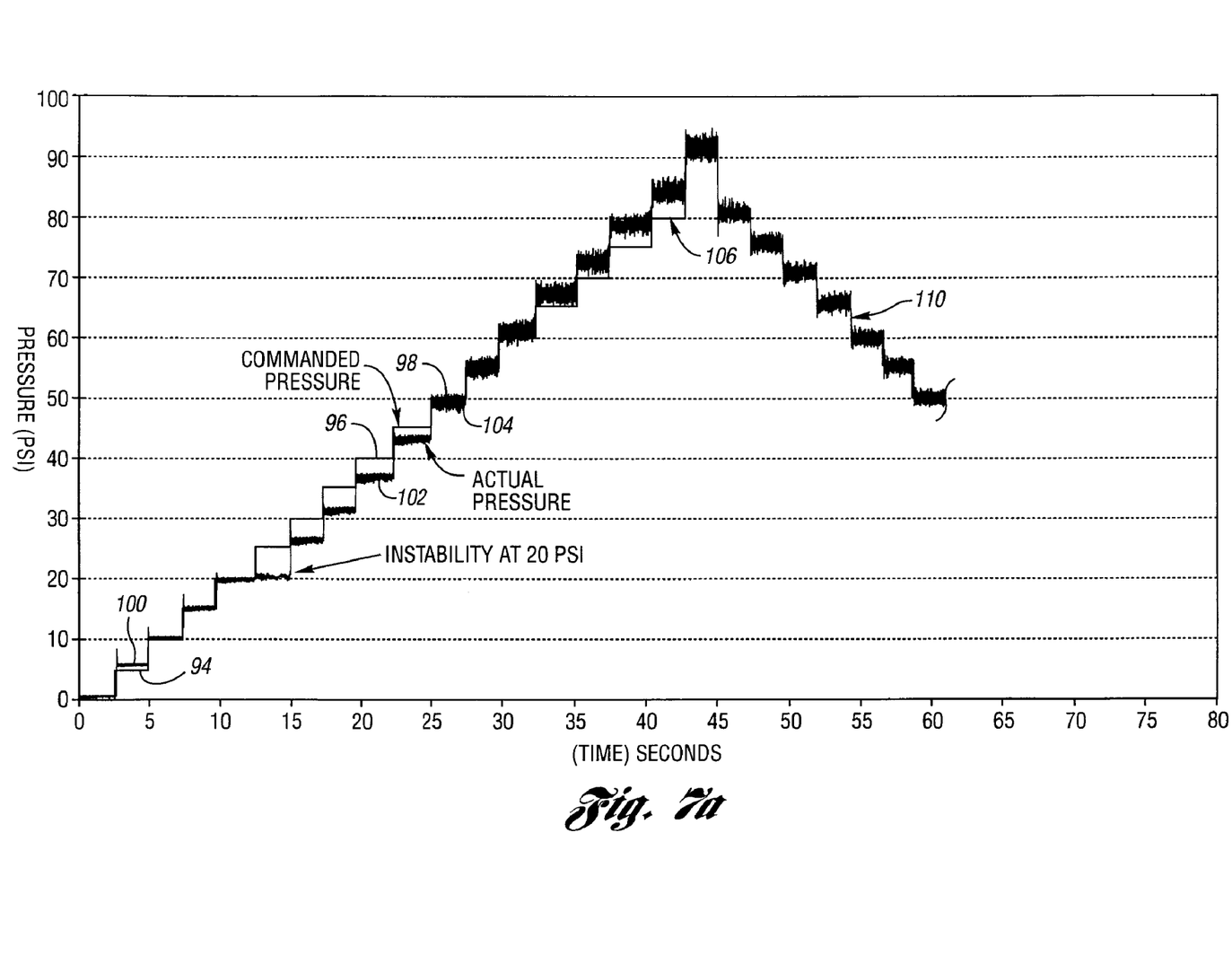
FIG. 7a is a time plot corresponding to the time plot of FIG. 7 wherein dynamic instability is demonstrated in a range of pressures between 10 psi and 40 psi.

FIG. 7 and FIG. 7a plot commanded pressure 94, 96 and 98 (or expected pressure) (psi) and actual pressure 100, 102 and 104 (psi) with respect to time. The plot for FIG. 7a was generated using constant 200 Hz dither frequency. It is a good example of instability and the relationship of the instability to hysteresis. When the test of FIG. 7a begins, the value of the commanded pressure at 94 is substantially the same as the actual pressure at 100. The actual point of instability is between 10 and 15 seconds, where actual pressure remained at 20 psi as opposed to achieving the commanded value of 25 psi as seen in FIG. 7a. Subsequently, a separation between actual pressure at 102 and commanded pressure at 96 exhibits a condition analogous to hysteresis. Eventually, commanded and actual pressures intersect at 98 and 104.

Following a return to stability, as shown at 98 and 104 in FIG. 7a, a test at a subsequent time of 40–45 seconds in the test period again indicates instability as shown at 106.

As control pressures decrease during the bench test indicated in FIG. 7a, stability again is indicated at 110.

In comparison to FIG. 7a, FIG. 7 is a good example in which instability is avoided through dynamic dither frequency control. The instability area was characterized during calibration as being between 10 and 40 psi in FIG. 7a. Knowing this, the dither frequency is changed from 200 Hz to zero dither frequency between 10 to 40 psi and then returned to 200 Hz dither frequency after the 40 psi point. Clearly, the actual pressure 102' changed values in the 10 to 40 psi range to nearly match the commanded pressure 96'. The slight difference between the plots exhibits low hysteresis. Additionally, the instability exhibited in FIG. 7a between 20 and 25 psi is eliminated. It is noteworthy that the same transmission and solenoid was used to generate the plots in FIG. 7a and FIG. 7 and that the area of change was related to the use of the dynamic dither frequency control.

The powertrain control module 21 can be calibrated for predicted instability for control valve current at points C and D, for example, of FIG. 6. The dither frequency controller response is a change in the dither frequency, as previously explained. The advantage of using a dither frequency superimposed on a base control current, which is discussed previously, is lost during the period the controller 78 adjusts the dither current oscillator frequency. But this is relatively inconsequential compared to the substantial disadvantages of instability that are avoided. The percentage of the operating time during which dither frequency is modified is very short compared to the overall operating time of the valve system.

Figure 4:
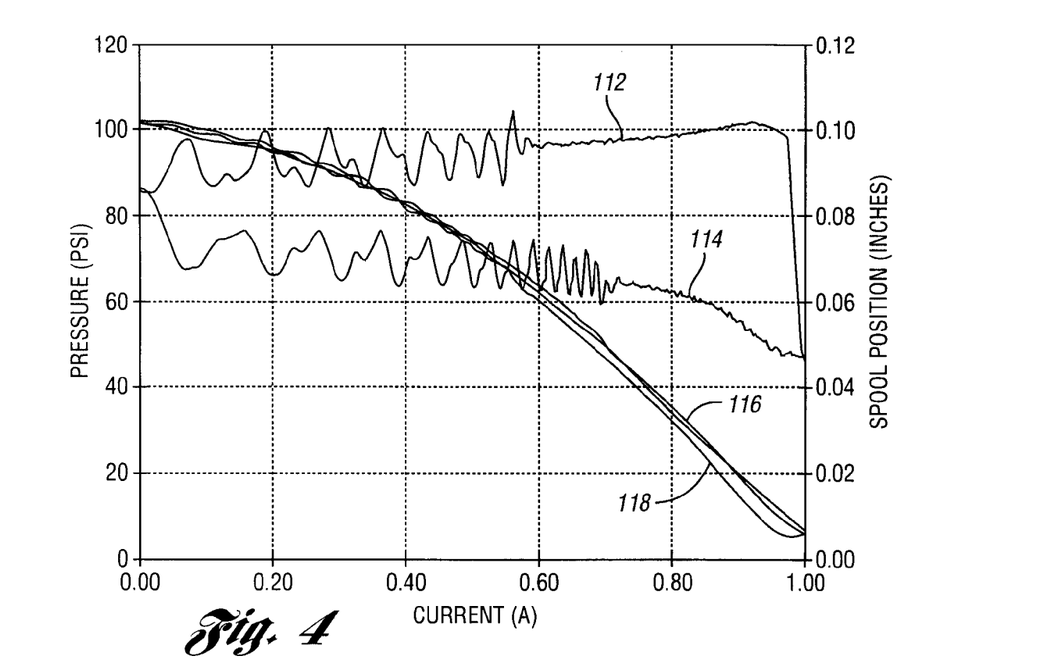
FIG. 4 is a plot of simulated pressure and valve spool position versus current for a solenoid-operated valve in which the valve is stable.

FIG. 4 shows a computer simulated pressure trace for a solenoid-operated valve as solenoid current changes. The characteristics indicated in FIG. 4 show that in a range of approximately 0.6 amps to 1.0 amps, the control pressure is approximately 10 psi to 60 psi, as indicated by traces 116 and 118. The corresponding valve spool position traces are shown at 114 and 112, respectively. Traces 114 and 112 demonstrate a stable valve system since there is a lack of fluctuating spool position peaks characteristic of instability. The position fluctuations seen at the left side of FIG. 4 are normal fluctuations at lower solenoid current values. They are inconsequential. They are caused by normal force-induced valve spool position oscillations in the valve and spring mass combination when the valve lands are not at metering edges.

The control pressure achieved during increasing current is shown by plot 118, and a corresponding control pressure plot with a decreasing current is shown at 116. The separation of these two curves at 116 and 118 is an indication of hysteresis. The magnitude of the hysteresis is relatively small in a stable valve system.

Figure 5:
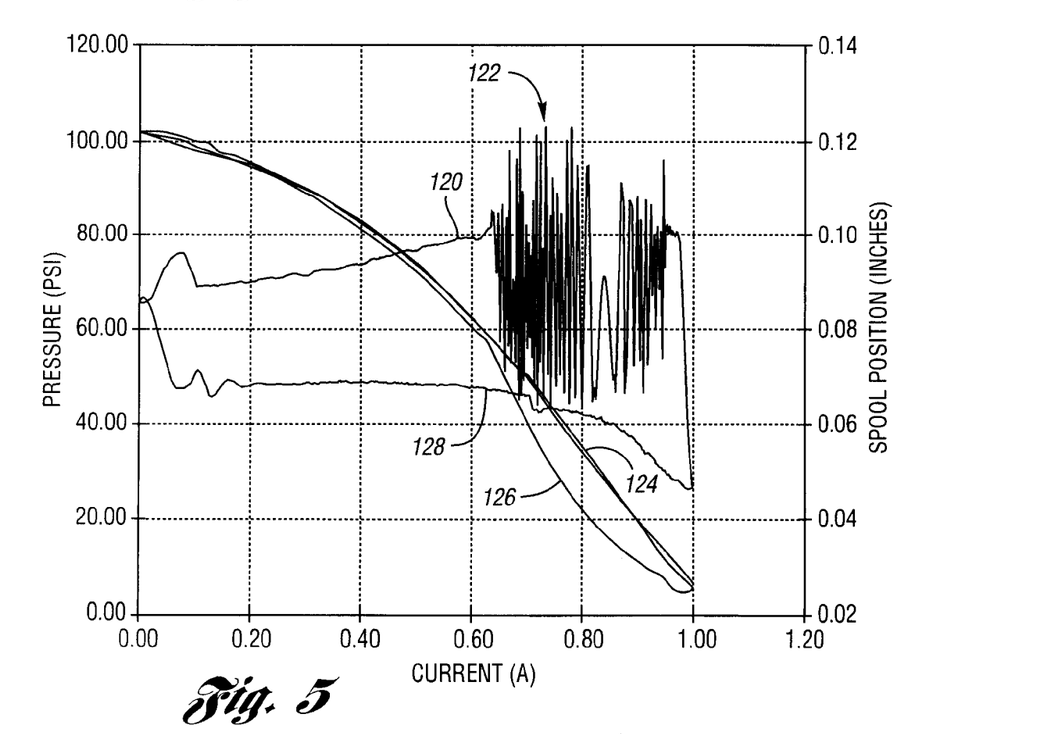
FIG. 5 is a plot corresponding to the plot of FIG. 4 wherein the valve is unstable and valve hysteresis is increased relative to the normal hysteresis illustrated in FIG. 4.

In contrast to FIG. 4, FIG. 5 shows an unstable valve system where the spool position traces at 120 and at 128 corresponding to a current of 0.6 amps are stable, but the spool position becomes unstable in region 122 as the current is increased to a range of about 0.7 to 0.9 amps.

The control pressure plot corresponding to the position trace at 120 is indicated in FIG. 5 at 126 as the current increases. The pressure plot for the decreasing current is indicated at 124. This corresponds to the position trace 128. The separation between pressure plots 124 and 126 indicates a large undesirable hysteresis.

Figure 2:
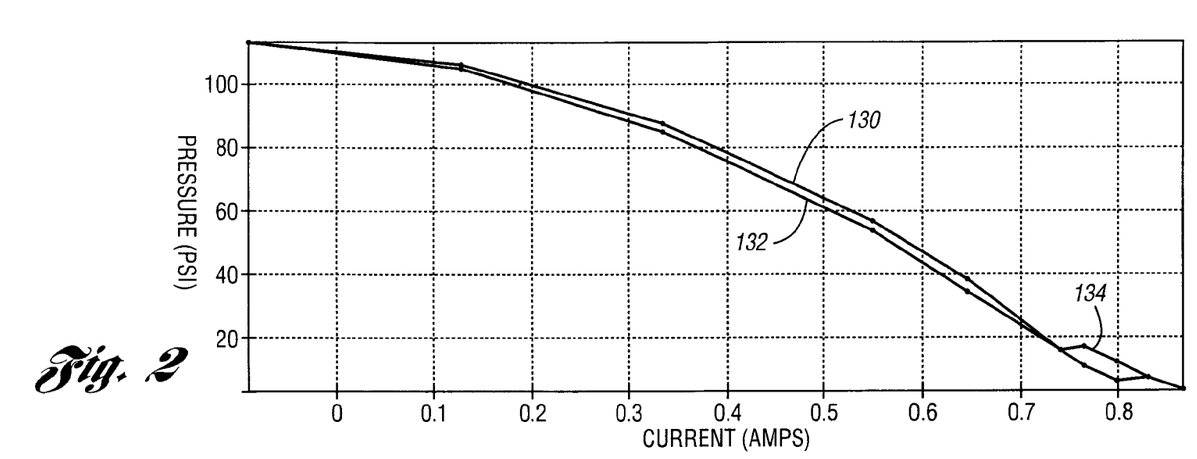
FIG. 2 is a transfer function plot of control valve pressure versus current for an automatic transmission control valve that is actuated by a solenoid using a dither frequency of 200 Hz where instability is present.

FIG. 2 shows a plot of control valve pressure versus solenoid current (200 Hz dither for the current). This is a plot of transfer functions for the solenoid-operated valve. The transfer function with an increase in current is shown at 132 and the transfer function with a decrease in current is shown at 130. The effect of instability on the transfer function is indicated at 134 where the transfer function plots separate at a value of 0.75 amps to 0.85 amps.

Figure 2A:
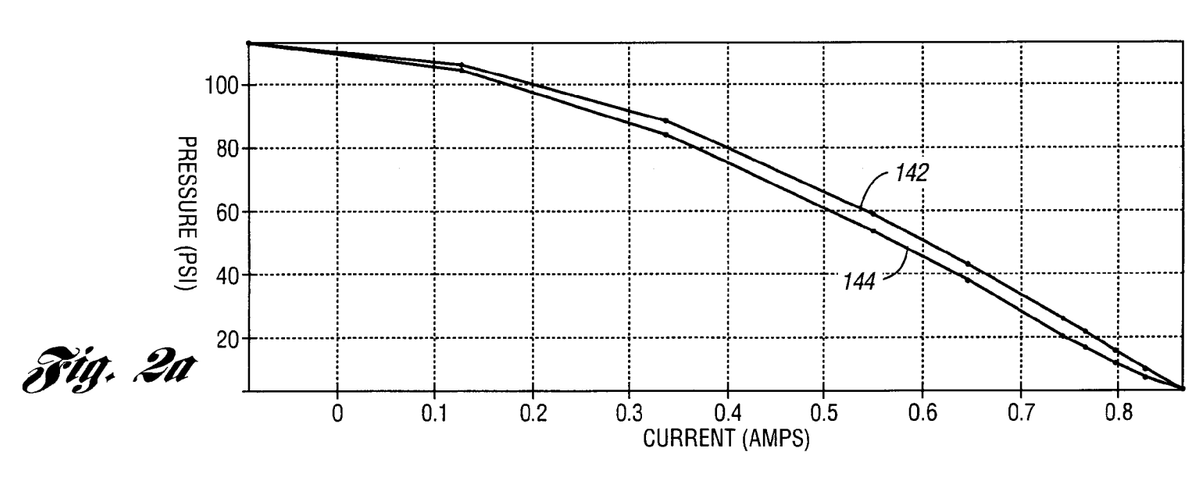
FIG. 2a is a plot corresponding to the plot of FIG. 2, where stability is present due to dynamic dither frequency control.

In comparison, FIG. 2a is a plot of the same information as in FIG. 2 except that current dither is zero Hertz. Additionally, FIG. 2b also plots the same information as in FIG. 2 except that the current dither frequency is 400 Hz. Both FIG. 2a and FIG. 2b exhibit return to stability in the area of instability exhibited in FIG. 2 between 0.75 amps to 0.85 amps. It is noteworthy that the same solenoid and transmission was used to generate all three plots and that only the dither frequency was changed to achieve pressure stability.

Figure 3:
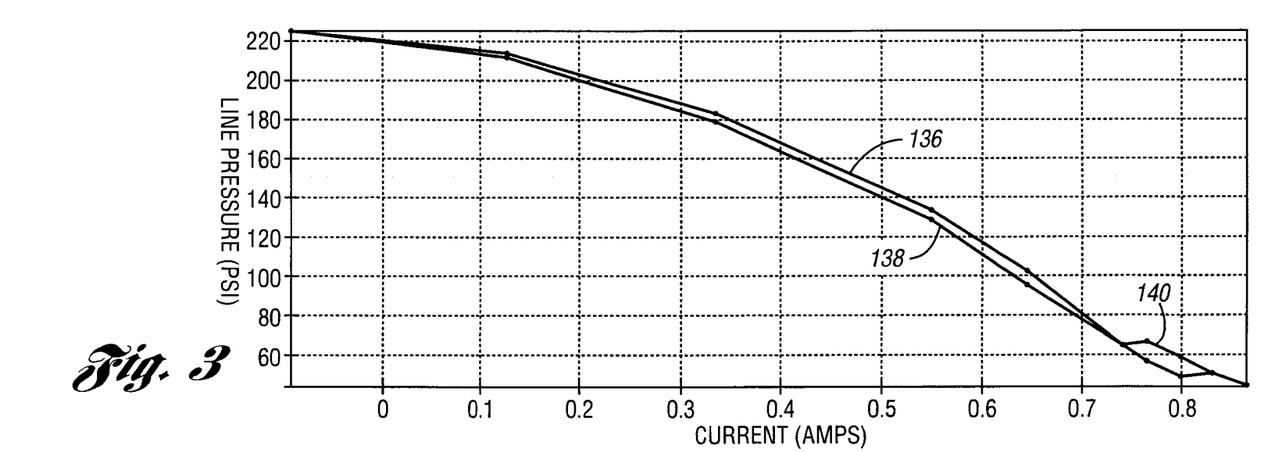
FIG. 3 is a transfer function plot corresponding to FIG. 2 with a dither frequency of 200 Hz, which demonstrates the relationship of solenoid current to line pressure rather than to control valve pressure, where instability is present.

The plot of FIG. 3 shows the transfer functions for line pressure with an increase in current and for a decrease in current. These respectively are indicated at 138 and 136. Instability is demonstrated in the transfer functions, as shown at 140. The plot of FIG. 3 is substantially similar to the plot of FIG. 2 since line pressure typically is a linear function of throttle valve pressure.

Figure 3A:
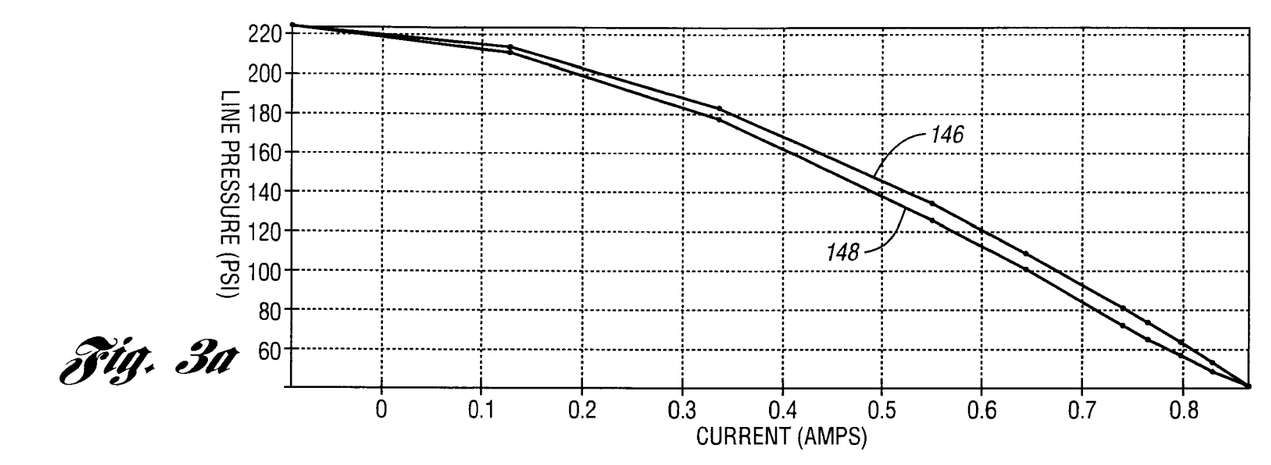
FIG. 3a is a plot corresponding to the plot of FIG. 3 where stability is present due to dynamic dither frequency control.

The transfer function plots of FIGS. 2a and 3a, where the dither frequency is zero, correspond respectively, to the plots of FIGS. 2 and 3, where the dither frequency is 200 Hz. In the case of FIGS. 2a and 3a, the instability shown at 134 and 140 in FIGS. 2 and 3, respectively, is eliminated. This is due to the zero dither frequency. The lack of a dither frequency in the case of FIG. 2a causes more separation of the plots, but the instability at 134 in FIG. 2 is not present in FIG. 2a.

Figure 2B:
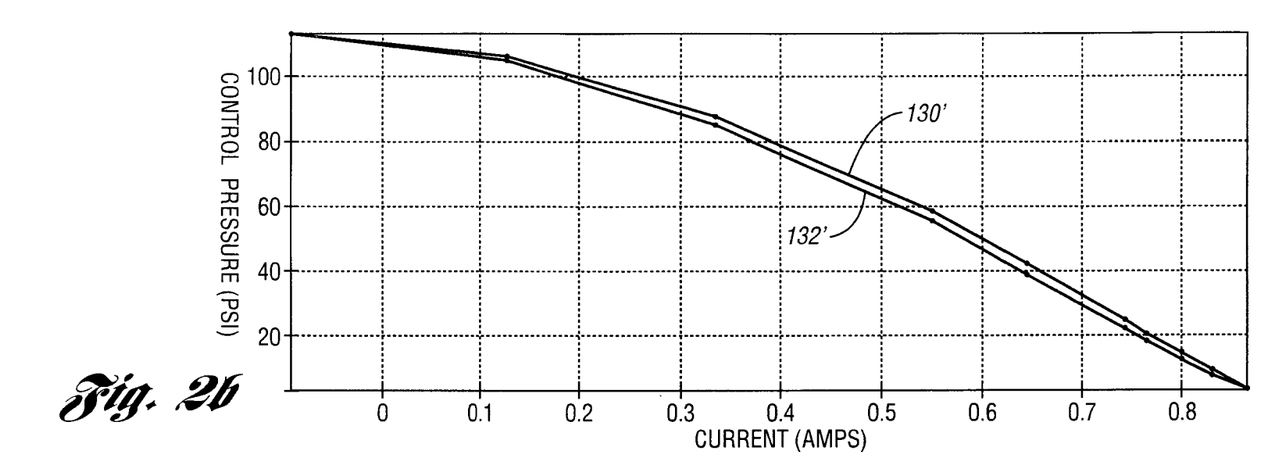
FIG. 2b is a plot corresponding to FIG. 2a wherein a dither frequency of 400 Hz is used and stability is present due to dynamic frequency control.
Figure 3B:
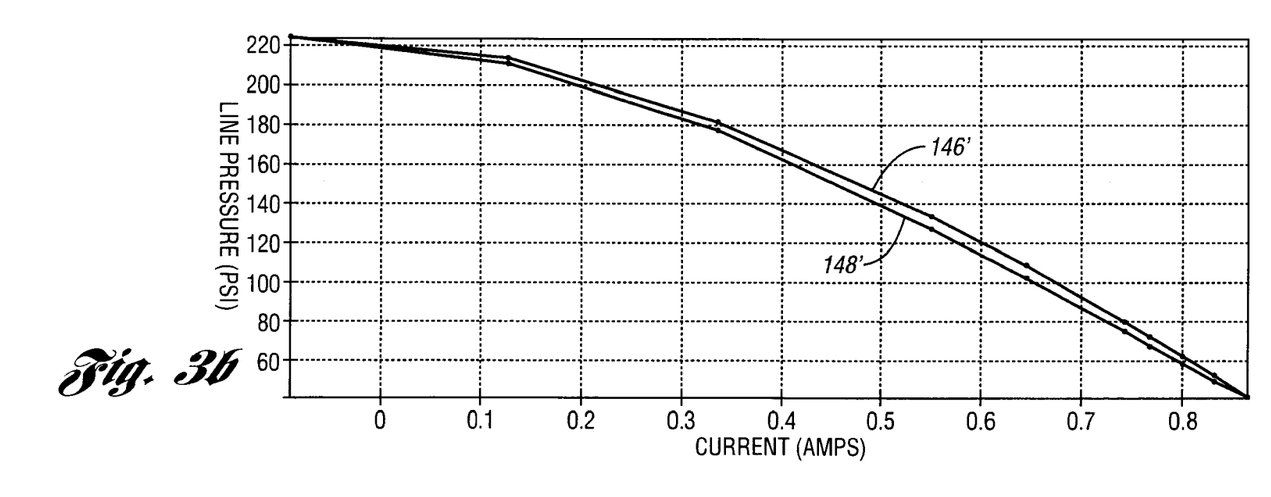
FIG. 3b is a plot corresponding to FIG. 3a wherein a dither frequency of 400 Hz is used and stability is present due to dynamic frequency control.

FIGS. 2b and 3b show transfer function plots that use a dither frequency of 400 Hz. These figures correspond, respectively, to FIGS. 2a and 3a. The pressure indicated in FIG. 2b is control pressure and the pressure indicated in FIG. 3b is line pressure. These figures demonstrate that stability is achieved by changing dither frequency to 400 Hz. The instability shown at 134 in FIG. 2 is not present in FIG. 2b. The numerals used in FIGS. 2b and 3b to identify the plots correspond to the numerals used in FIGS. 2a and 3a, respectively, but prime notations are added to the numerals in FIGS. 2b and 3b.

The control pressure transfer function of FIG. 2a has a characteristic shape similar to the characteristic shape of the line pressure transfer function of FIG. 3a. This is because, as previously explained, line pressure is a linear function of control pressure. The plots 130 and 132 in FIG. 2 correspond, respectively, to plots 142 and 144 in FIG. 2a. The plots 136 and 138 in FIG. 3 correspond, respectively, to plots 146 and 148 in FIG. 3a.

Although an embodiment of the invention has been disclosed, it will be apparent to persons skilled in the art that modifications may be made without departing from the scope of the invention. All such modifications and equivalents thereof are intended to be covered by the following claims.

The invention claimed is:

1. A method for stabilizing operating characteristics of a solenoid-operated fluid pressure control valve system in a control valve circuit, the control valve system comprising a solenoid actuator having a stator coil, an adjustable armature responsive to electromagnetic forces and an opposing spring force, and a fluid pressure regulator valve element coupled to the armature, the method comprising:
   applying a base actuating current to the stator coil to effect control of pressure by the control valve system;
   establishing an electrical dither frequency for the base actuating current to effect compliance of the control valve system as a function of electrical dither frequency as fluid pressure is controlled in response to a pressure command; and
   changing the electrical dither frequency at regulated pressure values within a precalibrated range of regulated pressure values whereby instability of the valve system is avoided;
   the electrical dither frequency being established at a value that exceeds a natural frequency for the solenoid actuator;
   the step of changing the electrical dither frequency comprising interrupting it when regulated pressure values are within the precalibrated range.

2. The method set forth in claim 1, wherein the controlled pressure is changed by the valve assembly as the base actuating current is varied in accordance with a precalibrated transfer function and wherein variations in control valve system compliance relative to transfer function effect a hysteresis whereby a change in controlled pressure due to increases in base actuating current are different than a change in controlled pressure due to decreases in base actuating current, the hysteresis being moderated when regulated pressure values are within the precalibrated range as electrical dither frequency is interrupted.

3. A method for stabilizing operating characteristics of a solenoid-operated fluid pressure control valve system in a control valve circuit, the control valve system comprising a solenoid actuator having a stator coil, an adjustable armature responsive to electromagnetic forces and an opposing spring force, and a fluid pressure regulator valve element coupled to the armature, the method comprising:
   applying a base actuating current to the stator coil to effect control of pressure by the control valve system;
   establishing an electrical dither frequency for the base actuating current to effect compliance of the control valve system as a function of electrical dither frequency as fluid pressure is controlled in response to a pressure command; and
   changing the electrical dither frequency at regulated pressure values within a precalibrated range of regulated pressure values whereby instability of the valve system is avoided;
   the controlled pressure being changed by the valve assembly as the base actuating current is varied in accordance with a precalibrated transfer function;
   variations in control valve system compliance relative to the transfer function effecting a hysteresis whereby a change in controlled pressure due to increases in base actuating current are different than a change in controlled pressure due to decreases in base actuating current, the hysteresis being moderated when regulated pressure values are within the precalibrated range as electrical dither frequency is changed.

4. A method for stabilizing operating characteristics of a solenoid-operated fluid pressure control valve system in a control valve circuit, the control valve system comprising a solenoid actuator having a stator coil, an adjustable armature responsive to electromagnetic forces and an opposing spring force, and a fluid pressure regulator valve element coupled to the armature, the method comprising:
   applying a base actuating current to the stator coil to effect control of pressure by the control valve system;
   establishing an electrical dither frequency for the base actuating current to effect compliance of the control valve system as a function of electrical dither frequency as fluid pressure is controlled in response to a pressure command; and
   changing the electrical dither frequency at regulated pressure values within a precalibrated range of regulated pressure values whereby instability of the valve system is avoided;
   the electrical dither frequency being established at a value that exceeds a natural frequency for the solenoid actuator;
   the step of changing the electrical dither frequency comprising adding to the electrical dither frequency a precalibrated frequency value when regulated pressure values are within the precalibrated range.

5. A control valve system for a geared automatic transmission comprising a variable force solenoid regulator valve for establishing a regulated pressure;

an automatic transmission control valve circuit means for effecting control of pressure-operated transmission friction element actuators;

the solenoid regulator valve having a solenoid coil, an adjustable spring-loaded armature within an electromagnetic flux field for the solenoid coil and a regulating valve element coupled to the armature;

means for applying a solenoid current to the solenoid coil to effect balanced valve element forces on the valve element, the solenoid current having a high frequency dither frequency superimposed on it, thereby reducing variations in solenoid regulator valve system compliance; and means for changing the dither frequency at precalibrated range of regulated pressure values corresponding to solenoid regulator valve dynamic instability, thereby improving control valve circuit means compliance for regulated pressure relative to solenoid current in accordance with a precalibrated transfer function.

6. The control valve system as set forth in claim 5, wherein the means for changing dither frequency effects an interruption in dither frequency in the precalibrated range of regulated pressure values, thereby avoiding system dynamic instability.

7. The control valve system set forth in claim 5, wherein the means for changing the dither frequency effects a precalibrated increase in dither frequency in the precalibrated range of regulated pressure values, thereby avoiding system dynamic instability.

8. A control valve system for a geared automatic transmission comprising a variable force solenoid regulator valve for establishing a regulated pressure;

an automatic transmission control valve circuit means for effecting control of pressure-operated transmission friction element actuators;

the solenoid regulator valve having a solenoid coil, an adjustable spring-loaded armature within an electromagnetic flux field for the solenoid coil and a regulating valve element coupled to the armature;

a solenoid voltage supply communicating with the solenoid coil for developing solenoid coil current to effect balanced valve element forces;

a dither frequency oscillator communicating with the voltage supply to develop a dither frequency for the solenoid coil current, thereby reducing variations in solenoid regulator valve system compliance; and a dither frequency controller communicating with the dither frequency oscillator for changing the dither frequency in a precalibrated range of regulated pressure values corresponding to solenoid regulator valve dynamic instability, thereby improving control valve circuit compliance for regulated pressure relative to solenoid current in accordance with a precalibrated transfer function.

* * * * *